United States Patent Office 3,470,183

Patented Sept. 30, 1969

3,470,183

THIENOPYRIMIDINES

Barbara Roth, Scarsdale, N.Y., assignor to Burroughs Wellcome & Co. (U.S.A.) Inc., Tuckahoe, N.Y., a corporation of New York No Drawing. Filed June 6, 1967, Ser. No. 643,833
Claims priority, application Great Britain, June 9, 1966, 25,752/66
Int. Cl. C07d *99/06, 63/18;* A61k *27/00*
U.S. Cl. 260—256.5 4 Claims

ABSTRACT OF THE DISCLOSURE

Thienopyrimidines of the formula

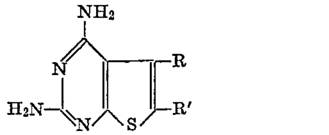

(I)

wherein R and R' may be lower alkyl, and wherein R' or R may be a hydrogen atom. R and R' may also be phenyl, benzyl or phenethyl optionally substituted with halogen or lower alkoxy. The compounds are useful as antibacterials, anthelmintics and as anti-protozoal agents.

This invention relates to new, novel and useful thieno [2,3-d]pyrimidine compounds. The new, novel and useful 2,4-diamino thieno[2,3-d]pyrimidine compounds according to the invention are shown in Formula I

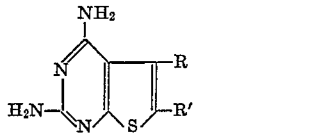

(I)

where R and R' are selected from the class consisting of alkyl, aralkyl and aryl and one of R and R' may be a hydrogen atom. In the above formula alkyl has, preferably, 1 to 4 carbon atoms (i.e. methyl, ethyl, propyl, butyl) arakyl has, preferably, not more than 8 carbon atoms and is preferably, benzyl and phenethyl and aryl is phenyl, the aryl or aralkyl being optionally substituted with halogen such as chloro, bromo, iodo and fluoro, preferably meta- or para-substituted or lower alkoxy-substituted (i.e. methoxy, ethoxy, propoxy, butoxy) on the phenyl ring.

The preferred compounds of Formula I are 2,4-diamino-5-(p-bromo-phenyl)thieno[2,3-d]pyrimidine and 2,4-diamino-5-methyl-6-benzyl-thieno[2,3-d]pyrimidine.

The compounds of Formula I are useful as antibacterial agents which may be topically applied, given orally or parentally to mammals. The compounds of Formula I have been found to be effective against *Escherichia coli* which causes urinary tract infections in mammals, (i.e. humans, mice, etc.).

The compounds of Formula I may be administered in a dosage range of 5 to 10 mg./kg. of mammal body-weight when given orally or parentally 2 to 3 times per day.

The compounds of Formula I are also useful for inhibiting the growth of *Lactobacillus casei* bacteria and, thus, are useful in preventing spoilage of milk and beer. In milk, the compounds may be used in amounts of 1 to 200 micrograms/quart of liquid. The compounds of Formula I are also useful as anthelmintics and as anti-protozoal agents.

The compounds of Formula I can conveniently be prepared by any method which performs a pyrimidine ring closure on appropriately substituted thiophenes, or performs thiophene ring closure on appropriately substited pyrimidines, or provides the desired substituents at the 2, 4, 5 and 6 positions on the thieno[2,3-d]pyrimidine structure. For example, a 2,4-diaminothieno[2,3-d]pyrimidine derivative may be prepared by cyclising a compound of Formula II

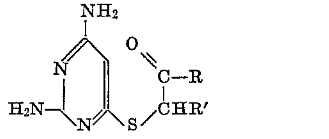

(II)

where R and R' represent the optional substituents in the 5 and 6 positions of the cyclisation product. The ease of cyclization of the compound of Formula II depends on the nature of the substituents R and R'. For example, when R is an alkyl group having from 1 to 4 carbon atoms and R' is a bulky substituent such as benzyl, condensation takes place readily and is favored by dilute acid. But when R is larger, such as substituted phenyl, and R' is a small group, the cyclization of a compound of Formula II to produce a 2,4-diamino-thieno[2,3-d]-pyrimidine requires more drastic treatment, e.g. heating in an inert solvent such as diphenylether to around 200° C. In the latter case, under conditions of low temperature and in concentrated acid, the cyclization of the compound of Formula II takes place through the nitrogen atom at position I of the pyrimidine moity, giving a biologically useful bactericidal thiazolo pyrimidine of Formula III.

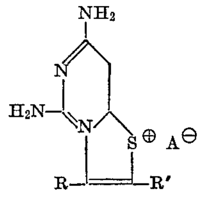

(III)

where A is an anion.

A compound of Formula II may be readily prepared by reacting 2,4-diamino-6-mercaptopyrimidine, in the form of its salt, such, as its sodium salt or the like, with an α-bromo-ketone of Formula IV Br—CHR'—COR (IV)

The 2,4-diaminothieno[2,3-d]pyrimidine derivatives of the present invention may be prepared for pharmaceutical use in association with a pharmaceutically acceptable carrier. The compounds may be advantageously presented in discrete units such as tablets, capsules, cachets, ampoules or suppositories, each containing a predetermined amount of the compound. They may also be presented as powders or granules, as solutions or suspensions in aqueous, non-aqueous or emulsified liquids, or as ointments. For parenteral use, the formulations of this invention may be made by any of the methods of pharmacy and may include one or more of the following accessory ingredients: diluents, solutes, buffers, flavoring, binding, dispersing, surface-active, thickening, lubricating and coating materials, preservatives, antioxidants, bacteriostats, suppository and ointment bases, and any other acceptable excipients.

According to the present invention there is provided:

(a) A compound of Formula I as hereinbefore defined;

(b) A method of preparing a compound of Formula I as described herein;

(c) A pharmaceutical preparation comprising a compound of Formula I as active ingredient in admixture with a pharmaceutically acceptable carrier;

(d) A method of preparing a pharmaceutical preparation comprising the admixture of a compound of Formula I as active ingredient with a pharmaceutically acceptable carrier.

The following examples illustrate the invention:

EXAMPLE 1

A mixture of 2,4-diamino-6-mercaptopyrimidine (2.84 g.), sodium methoxide (1.2 g.), and ethylene glycol (35 ml.), was heated with stirring to 80° C. at which point all of the solid material had entered solution. p-Bromophenacyl bromide (5.56 g.) was added and the mixture heated for 45 minutes, during which time a precipitate separated. After chilling, the product was isolated by filtration and additional product recovered by adding water to the filtrate. Recrystallization from an acetone-water mixture (85:15) produced 2,4-diamino-6-(p-bromophenacylthio)pyrimidine as large off-white plates melting at 199–200° C.

A mixture of 2,4-diamino-6-(p-bromophenacylthio) pyrimidine (10 g.) and diphenyl ether (60 ml.) was heated in an oil bath to 210° C. and held at this temperature for five minutes. After cooling, the insoluble material was separated and hexane was added to the filtrate. A tan precipitate separated and this was purified by recrystllization from ethanol to produce 2,4-diamino-5-(p-bromophenyl)thieno[2,3-d]pyrimidine as light cream plates melting at 224–225° C.

EXAMPLE 2

A mixture of 2,4-diamino-6-mercaptopyrimidine (14.2 g.), sodium methoxide (5.9 g.) and ethyleneglycol (140 ml.) was heated to 80° C., yielding a clear solution. Methyl 1-bromo-2-phenylethyl ketone (23 g.) was added to this mixture and the resulting solution was heated at 110° C. for thirty minutes, followed by chilling. Water was added to precipitate the product and the pH was adjusted to neutral with hydrochloric acid. The impure gummy precipitate was slurried in warm 0.1 N hydrochloric acid, which caused initial partial solution followed by the separation of a heavy white precipitate. Purification was effected by treating with dilute alkali, followed by recrystallization from ethanol to produce the pure cyclized product, 2,4-diamino-5-methyl-6-benzylthieno[2,3-d]pyrimidine as white crystals melting at 227–228° C.

EXAMPLE 3

A mixture of 2,4-diamino-6-(p-bromophenacylthio) pyrimidine (4.0 g.) and concentrated sulphuric acid (24 ml.) was heated on a steam bath for two hours in a flask protected from moisture. The clear solution was chilled and poured on ice. A gummy precipitate separated, which soon crystallized to a fine white solid. This was recrystallized from 0.5 molar sulphuric acid and was washed well with ice water followed by ethanol and ether. The product was 3-(p-bromophenyl)-5-aminothiazolo[3,2-o]pyrimid-7-onimine sulphate in the form of fine white crystals.

What is claimed is:

1. The compound

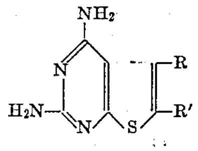

where R and R′ are selected from the class consisting of lower alkyl, benzyl, phenethyl and phenyl, wherein one of R and R′ may be a hydrogen atom and wherein the phenyl, benzyl and phenethyl may be substituted in the ring with halogen and lower alkoxy.

2. 2,4-diamino - 5 - (p-bromo - phenyl)thieno[2,3-d]-pyrimidine.

3. 2,4-diamino - 5 - methyl - 6 - benzyl thieno[2,3-d]-pyrimidine.

4. The compound of formula

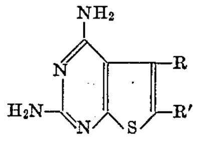

where R and R′ is lower alkyl and wherein one of R and R′ may be a hydrogen atom.

References Cited

FOREIGN PATENTS 1,057,612 2/1967 Great Britain.

ALEX MAZEL, Primary Examiner

R. J. GALLAGHER, Assistant Examiner

U.S. Cl. X.R.

424—251